(No Model.) 3 Sheets—Sheet 1.
L. EBERHART.
SEED SOWER.
No. 460,120. Patented Sept. 29, 1891.
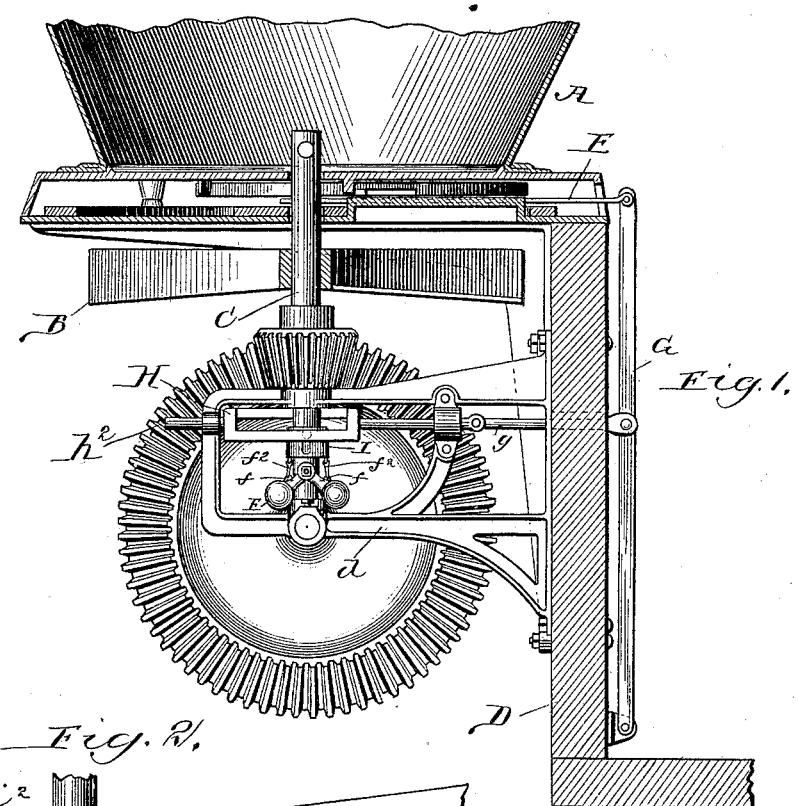
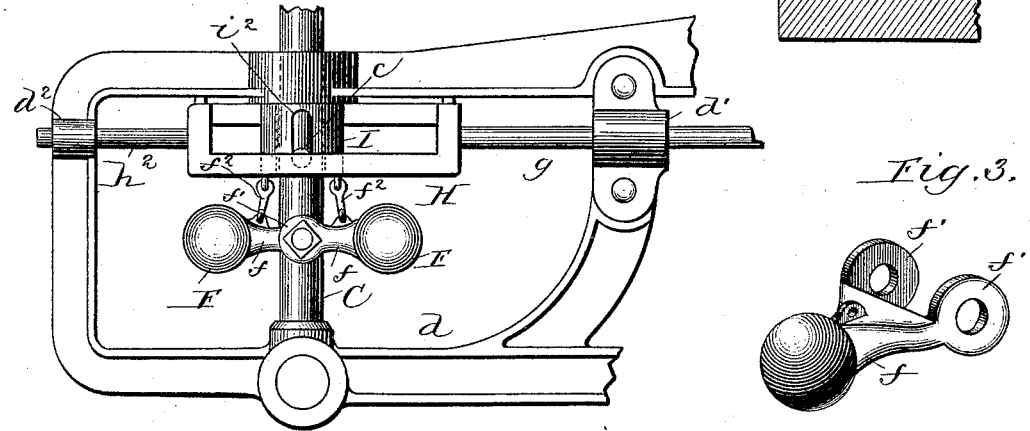
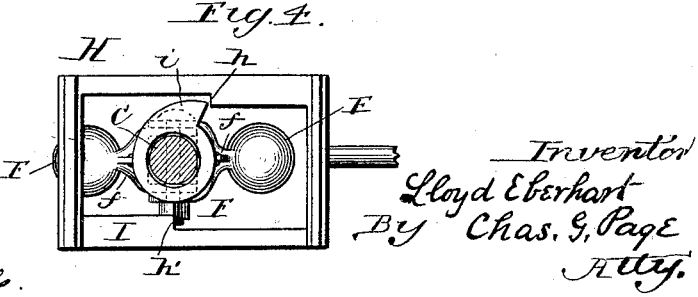
Witnesses
W. Rossiter
Fredk. H. Mills.
Inventor
Lloyd Eberhart
By Chas. G. Page
Atty.

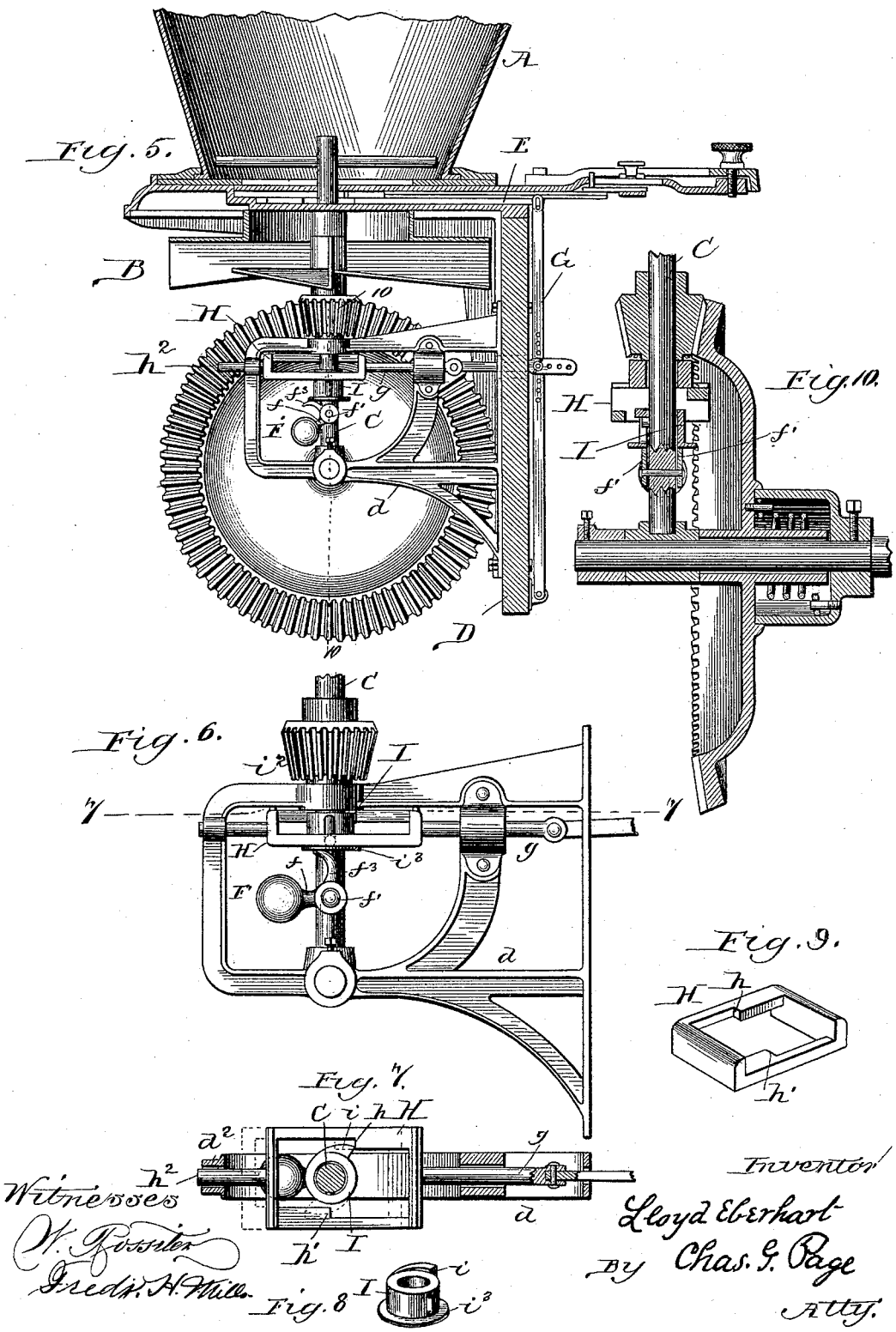

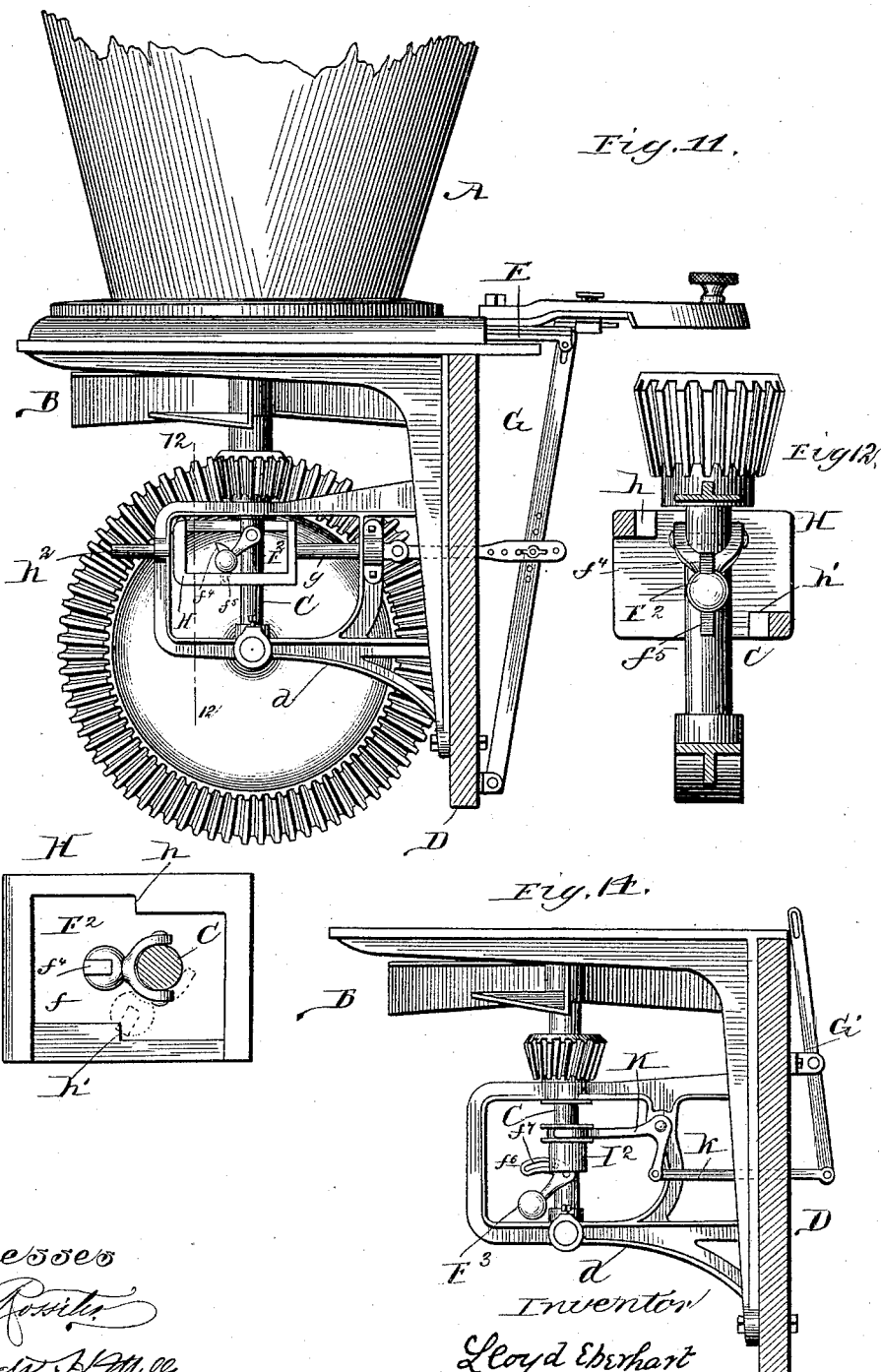

United States Patent Office.

LLOYD EBERHART, OF JOLIET, ILLINOIS.

SEED-SOWER.

SPECIFICATION forming part of Letters Patent No. 460,120, dated September 29, 1891.

Application filed January 24, 1889. Serial No. 297,454. (No model.)

*To all whom it may concern:*

Be it known that I, LLOYD EBERHART, a citizen of the United States, residing at Joliet, in the county of Will and State of Illinois, have invented a certain new and useful Improvement in Seed-Sowers, of which the following is a specification.

My invention, while capable of service in various kinds of seed-sowers, is particularly applicable as an improvement in seed-sowers of that class in which the seed-sower is provided with a hopper having one or more valve-controlled ports and a rotary distributer arranged in position below the hopper to receive and distribute the seed, the usual way of operating the rotary distributer in such case being to drive it from one of the rear wheels of a wagon, to which the seed-sower is commonly attached.

The object of my invention, generally stated, is to provide efficient means for automatically operating a valve or valves for controlling the flow of seed in a seed-sower, whether such control consists in regulating the quantity of the discharge or positively opening and closing one or more seed ports or passages and to effect such automatic operation from the starting up and stoppage of the seed-sower.

A further particular object is to automatically operate in a seed-sower a valve of the kind commonly known as a "cut-off slide" and usually employed in connection with a valve device for regulating the quantity of the discharge, it being, however, herein understood that the term "a valve for controlling the flow of seed" includes a cut-off slide as well as a valve for regulating the quantity of the discharge, since in either case the device, broadly considered, is a valve whereby the flow of seed is controlled.

A further object is to provide certain novel and improved combinations and details, as hereinafter particularly set forth.

In carrying out my invention I provide, in connection with a valve for controlling the flow of seed, a governor, from which the whole valve is adjusted in position, and a reverse movement, which is connected with the valve and arranged subject to the action of the governor, whereby when the seed-sower is started up the valve shall be automatically shifted into what may be termed a "working position," while on the other hand, as an incident to the stoppage of the seed-sower, the valve will be automatically and reversely shifted.

For the broader purpose of my invention I may employ various constructions of governors and various constructions of reverse movements; but in such connection I employ a valve which is independent of the rotary distributer, which is of course essential in a broadcast seed-sower for distributing the seed which is discharged from the hopper when the valve is open. In this way the rise or distention of the governor, due to its bodily revolution, serves to shift the reverse movement so as to open the valve, which will then remain stationary so long as the governor is maintained in such condition. On the other hand, when the governor drops or contracts it will shift the reverse movement so as to close the valve. The provision of a suitable reverse movement independent of the revolving governor, but subject to the same as aforesaid, permits the employment of a valve which can be adjusted in position, either open or closed, and there held until a reverse adjustment becomes necessary. The feature of thus holding the valve is important, since to revolve the valve in unison with the governor would necessitate providing the machine with an impracticable construction of valve, and, moreover, prevent its adjustment in a way to expose at different times different areas of discharge opening or openings.

While, as aforesaid, I may employ either a valve whereby the quantity of the discharge may be regulated or a valve constituting a cut-off slide, I prefer the employment of a valve constituting a cut-off slide or slides, so that while in addition thereto a valve may be used and set with reference to the quantity of the discharge and the kind of seed or to the point or points whereat it is desired that the seed shall fall upon a rotary distributer the flow of seed will be automatically established whenever the seed-sower is started up and automatically closed when the seed-sower is stopped, thereby avoiding all necessity of hand manipulation of the cut-off slide by an attendant with each start and stop of the machine.

In the accompanying drawings, Figure 1 is a vertical central section through the upper portion of a broadcast seed-sower, whereof the lower driving mechanism is in elevation, and represents the application of a governor in accordance with the principle of my invention, the governor in said figure being down in its normal condition. Fig. 2 is a detail representing in elevation and on a somewhat larger scale the governor and certain adjuncts, the governor-arms in said figure being in the raised condition into which they are brought by the revolution of the governor. Fig. 3 represents in perspective one of the governor-arms. Fig. 4 represents a section taken transversely through the rotary distributer-shaft at a point just above the slide H, said slide and the governor being in top plan view. Fig. 5 is a view similar to Fig. 1, but shows certain variations in details, as hereinafter set forth. Fig. 6 corresponds with Fig. 2, with the exception that it represents the form of governor illustrated in Fig. 5. Fig. 7 is a sectional plan on line 7 7, Fig. 6. Fig. 8 shows in perspective the sleeve I, having a cam or tappet. Fig. 9 is a perspective view of the slide. Fig. 10 is a section through the lower portion of the machine on line 10, Fig. 5. Fig. 11 is a view corresponding to Fig. 5, with the exception that only the end-board of the wagon is in section and a variation made in the governor. Fig. 12 is a detail section on line 12 12, Fig. 11, the large bevel-gear being omitted. Fig. 13 shows a section taken transversely through the distributer-shaft just above the slide H of Fig. 11, said slide and the governor being shown in top plan view. Fig. 14 represents in side elevation the lower portion of the seed-sower, with a further variation in the governor and mode of connecting the same with a valve.

In said drawings, A represents the hopper, (shown in part for convenience of illustration,) and B denotes the rotary distributer of a broadcast seed-sower. The vertical shaft C, which carries the rotary distributer, is understood to be driven from one of the wheels of a wagon to which the seed-sower is usually attached, it being customary to attach the seed-sower to the end-board D of a wagon.

In Fig. 1, E indicates a valve, which is understood to be suitably adapted for controlling the flow of seed from the hopper, and which is herein arranged as an ordinary cut-off slide, for either positively cutting off or permitting the establishment of the flow of grain, In the first four figures, F indicates a governor employed for automatically controlling said valve E, whereby when the seed-sower is started up the valve will open, while on the other hand the moment the seed-sower stops said valve will close. In said figures the governor comprises a couple of weighted arms $f$, which are bifurcated at their inner ends, so as to permit their divided ends $f'$ to embrace the rotary shaft or spindle C, to which they are pivotally attached. Between the valve E and the governor is a shifting or reverse movement arranged, so that when the arms of the governor are thrown out by means of the rotation of the spindle said reverse movement will be shifted so as to open the valve, while on the other hand, when the governor-arms drop by reason of the stoppage of the spindle, said reverse movement will be shifted in a way to close the cut-off slide. To such end the valve or cut-off slide is hinged to a vibratory lever G, which latter is, through the medium of a jointed rod $g$, connected with a slide H, the reciprocation of which said slide or movable abutment H will, through the medium of said rod and said lever, cause a similar movement on the part of the cut-off slide. As a means for operating the slide H, the spindle carries a sliding collar I, which is connected with the governor, as by links $f^2$, and adapted to engage and throw the slide one way when the governor-arms rise to a proper height, and also to engage and throw the slide in an opposite direction when the governor-arms have dropped to a suitable extent. The sliding collar I has for the aforesaid purpose a laterally-arranged projection or tappet $i$, and the slide has two oppositely-arranged shoulders $h$ and $h'$, one of which is somewhat higher than the other, whereby when the collar, while rotating in unison with the spindle, rises to a certain height its projection $i$ will strike the higher shoulder $h$, and thereby throw the slide in a direction to open the cut-off slide, while, on the other hand, when the rotating collar drops to a certain extent by reason of the drop and downpull of the governor-arms its projections $i$ will strike the lower abutment $h'$ and throw the same in a direction to close the valve or cut-off slide E. The collar may be caused to revolve with the spindle in any suitable way—as, for example, the collar can be provided with a slot $i^2$ for the reception of a pin $c$ in Fig. 2 on the spindle, or any other suitable mode of so keying the collar to the spindle that it may slide thereon can be employed. A more ready understanding of the positions of the shoulders $h$ and $h'$ on slide H may be had by referring to Fig. 9, wherein the slide is represented in perspective and shown as constructed with side bars, one higher than the other and each formed with an offset, which serves to produce a shoulder. The slide H can of course be supported in any suitable way, the mode of support herein shown being to provide the bracket $d$, which is attached to the end-board of a wagon, with a couple of bearings $d'$ and $d^2$, one for the rod $g$ at one end of the slide and the other for a rod $h^2$ at the opposite end of the slide. It will also be evident that the slide H can be connected with the cut-off slide through the medium of any suitable system of levers or like reverse movement which will cause the cut-off slide to be operated from the slide H.

From the foregoing arrangement it will be seen that should the spindle be put in motion by starting up the wagon or other wheeled support for the seed-sower the governor-arms will rise, and thereby cause the cut-off slide to open, while on the other hand, when the wagon or other wheeled support stops, the governor will during the act of stopping the wagon drop and cause the cut-off slide to close.

In Figs. 5, 6, and 10 the governor F' comprises but one weighted arm $f$, having its inner end preferably bifurcated, as in Fig. 3, whereby the portions $f'$ of its divided end may embrace and be pivotally attached to the spindle C. The governor F, in place of being connected with the sliding collar I by a link or other jointed connection, as in Figs. 1 and 2, is provided with a cam or upturned arm $f^3$, arranged to act against the under side of a flange $i^2$ on the collar, whereby when the weighted governor-arm $f$ is down, as in Fig. 5, the collar I will drop by gravity, while, on the other hand, when the weighted governor-arm $f$ is thrown out the cam or arm $f^3$ will serve to lift the collar, as in Fig. 6. In said Figs. 5 to 10, inclusive, the slide H and collar I are substantially the same as in the figures previously described, and, as in said figures, the slide H is supported and connected with a lever G, which is in turn connected with a valve E. The connecting-rod $g$ in Fig. 5 is, however, adapted for adjustable connection with the lever G, to which end both the lever and the rod can be provided with a line of holes, or any other suitable adjustable jointed connection between the two can be provided. Where the valve E is simply employed as a cut-off slide, the adjustable connection between the connecting-rod $g$ and the lever G can, if preferred, be dispensed with; but where either the valve E or such other valve as may be subject to the governor is adapted to regulate the quantity of the discharge by opening to some determinate extent a valved passage an adjustment in the connection between the governor and the valve will be desirable, since preparatory to operation said connection can be adjusted, whereby when the governor is brought into condition to open the valve it can open the same to a determinate extent, which is predetermined by said adjustment.

As an illustration of said application of a governor, the lever G could be employed for operating a double valve, such as embodied in Letters Patent No. 340,563, granted to myself and Irving D. Stevens April 27, 1886, it being obvious that various other forms or constructions of valves, whether single or double, could be employed in connection with the governor.

In Figs. 11, 12, and 13 the devices corresponding to devices for like purposes in prior figures are similarly lettered. In said Figs. 11, 12, and 13, however, the single-armed governor $F^2$ has a couple of cams or beveled projections $f^4$ and $f^5$, whereby during the rise and rotation of the governor the projection $f^4$ will strike the shoulder $h$ of slide H, so as to throw the latter in a direction to open the valve, while, on the other hand, during the descent and rotation of the governor the lug or projection $f^5$ will strike shoulder $h'$ on said slide, as in dotted lines, Figs. 11 and 13, so as to throw the slide in a direction to close the valve. It will also be observed that in Figs. 11, 12, and 13 I have dispensed with the sliding collar I, whereby the lugs or projections on the governor-arm take the place of the lug or cam $i$ on said sliding collar.

In Fig. 14 the single-weighted governor-arm of the governor $F^3$ is carried by the spindle and provided with an arm $f^6$, having a slot $f^7$, which receives a pin on the sliding collar $I^2$. In place of the slide H and sliding rod $g$ in said Fig. 14 I provide a bell-crank K, having one arm connected with a lever G' by a link $k$, and having its other arm forked to embrace and engage the collar $I^2$ at a point between two flanges on the latter, in which way the rise and the fall of the governor-arm will, by reason of its connection with the sliding collar, cause the latter to rise and fall and thereby operate the bell-crank, which will in turn operate the lever G'. It will also be observed that the lever G' may be pivoted between its ends in place of pivoting it at one end. It is understood that the lever G' can be connected either with a valve E or with any other construction of valve adapted for service in a seeding-machine without exercising more than ordinary mechanical intelligence.

While I prefer providing a seeding-machine with a governor for controlling a valve commonly known as a "cut-off slide," I desire for the broader purposes of this invention to cover a governor and reverse movement applied to automatically control the flow of seed, whether such control consists in positively opening and closing one or more ports or regulating the quantity of the discharge by opening one or more ports to some determinate extent, and hence I propose employing the governor with any suitable construction and arrangement of valve or valves. It will also be evident to those skilled in the art that various other reverse movements between the governor and a valve in a seeding-machine can be provided.

The spindle for the rotary distributer in a broadcast seeder provides a most desirable support for the governor; but so far as the broad principle is concerned some other rotary shaft or spindle could be employed.

What I claim as my invention is—

1. The combination, substantially as hereinbefore set forth, in a seed-sower, of the hopper, the rotary distributer and a governor supported to revolve in unison therewith, a valve for controlling the discharge from the hopper arranged above and independent of the rotary distributer, and a reverse movement for adjusting the valve from the action of the governor, for the purpose set forth.

2. The combination, substantially as hereinbefore set forth, in a seed-sower, of the hopper and a valve to control the discharge therefrom, a rotary distributer arranged below and independent of the valve, a governor arranged below the rotary distributer and pivoted upon the rotary spindle whereon said distributer is carried, and a reverse movement for adjusting the valve from the action of the governor.

3. The combination, substantially as hereinbefore set forth, in a seed-sower, of a valve for controlling the discharge from the hopper, a governor from which the valve is adjusted in position, and a reverse movement applied for adjusting the valve from the action of the governor, and comprising in its organization a vibratory lever G, which is connected with the valve.

4. The combination, substantially as hereinbefore set forth, in a seed-sower, of a valve for controlling the discharge from the hopper, a governor from which the valve is adjusted in position, and a reverse movement applied for adjusting the valve from the action of the governor and made adjustable as to the extent of its throw, so as to vary the extent of movement on the part of the valve.

5. The combination, substantially as hereinbefore set forth, in a seed-sower, of a valve for controlling the discharge from the hopper, a governor from which the valve is controlled, and a reverse movement applied for adjusting the movement of the valve from the governor, and comprising in its organization an adjustable joint formed by a rod or link adjustably pivoted to a lever G, which is connected with the valve.

6. The combination, substantially as hereinbefore set forth, in a seed-sower, of a valve for controlling the discharge from the hopper, a governor from which the valve is adjusted in position, and a reverse movement applied for adjusting the valve from the action of the governor, and comprising a movable abutment, which is suitably connected with the valve and shifted in opposite directions, respectively, from the rise and fall of the governor arm or arms.

7. The combination, substantially as hereinbefore set forth, in a seed-sower, of a valve for controlling the discharge from the hopper, a governor from which the valve is adjusted in position, a rotary spindle carrying the said governor, a revoluble tappet arranged to rise and fall in correspondence with the rise and fall of the arm or arms of the governor, and a movable abutment, which is suitably connected with the valve and shifted in opposite directions by the said tappet, substantially in the manner described.

8. The combination, substantially as hereinbefore set forth, in a seed-sower, of a valve for controlling the discharge from the hopper, a governor from which the valve is adjusted in position, a rotary spindle carrying the governor, a revoluble tappet arranged to slide upon the spindle and rise and fall with the rise and fall of the governor arm or arms, and a movable abutment, which is suitably connected with the valve and shifted in opposite directions by the tappet.

9. The combination, substantially as hereinbefore set forth, in a seed-sower, of a valve for controlling the discharge from the hopper, a governor from which the valve is adjusted in position, a spindle C, to which the governor is pivoted, a sleeve I, connected with the governor and arranged to slide upon but rotate with the spindle, the movable abutment provided with shoulders $h$ and $h'$, respectively, in different planes and connected with the valve, and a tappet $l'$ upon said sleeve, for the purpose described.

LLOYD EBERHART.

Witnesses:
CHAS. G. PAGE,
ANNIE COATES.